(12) United States Patent
Liu (10) Patent No.: US 9,077,199 B2
(45) Date of Patent: Jul. 7, 2015

(54) ELECTRONIC DEVICE WITH CONNECTION INTERFACE SUPPORTING SIGNAL COMMUNICATION AND CHARGING OPERATION

(71) Applicant: Quanta Computer Inc., Kuei Shan Hsiang, Tao Yuan Shien (TW)

(72) Inventor: Chien-Hung Liu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 324 days.

(21) Appl. No.: 13/744,836

(22) Filed: Jan. 18, 2013

(65) Prior Publication Data
US 2014/0111140 A1    Apr. 24, 2014

(30) Foreign Application Priority Data
Oct. 19, 2012 (TW) .............................. 101138569 A (51) Int. Cl.
*H02J 7/00* (2006.01)
(52) U.S. Cl.
CPC ....................... *H02J 7/007* (2013.01)
(58) Field of Classification Search
USPC ................................................ 320/103–109
See application file for complete search history.

(56) References Cited

U.S. PATENT DOCUMENTS

| 6,665,801 | B1 | 12/2003 | Weiss | |
|---|---|---|---|---|
| 2004/0164708 | A1* | 8/2004 | Veselic et al. | 320/132 |
| 2004/0246341 | A1 | 12/2004 | Lee et al. | |
| 2005/0174094 | A1 | 8/2005 | Purdy et al. | |
| 2012/0187897 | A1* | 7/2012 | Lenk et al. | 320/101 |
| 2012/0268074 | A1* | 10/2012 | Cooley et al. | 320/130 |

OTHER PUBLICATIONS

Taiwanese language office action dated May 5, 2014.
Universal Serial Bus Revision 3.0 Specification; Nov. 12, 2008; pp. 1-2.

* cited by examiner

Primary Examiner — Binh Tat
(74) Attorney, Agent, or Firm — McClure, Qualey & Rodack, LLP (57) ABSTRACT

An electronic device is provided. When the electronic device is at a power exhaustion state and a first external device with a charging function is coupled to a connection interface to provide a first supply voltage to a power pin of the connection interface, a voltage regulation unit transforms the first supply voltage to a first operation voltage, and a storage unit powered by the first operation voltage outputs device information of the electronic device to the first external device through a signal transmitting/receiving pin set of the connection interface. When the first external device provides a second supply voltage to the power pin in response to the device information, the electronic device enters a charging mode. In the charging mode, the charging unit provides a charging voltage according to the second supply voltage to charge the battery unit and provides a second operation voltage to a processing unit.

7 Claims, 6 Drawing Sheets

ELECTRONIC DEVICE WITH CONNECTION INTERFACE SUPPORTING SIGNAL COMMUNICATION AND CHARGING OPERATION

CROSS REFERENCE TO RELATED APPLICATIONS

This application claims priority of Taiwan Patent Application No. 101138569, filed on Oct. 19, 2012, the entirety of which is incorporated by reference herein.

BACKGROUND OF THE INVENTION

1. Field of the Invention

The invention relates to an electronic device which comprises a connection port capable of receiving a supply voltage and transmitting and receiving signals.

2. Description of the Related Art

Recently, portable electronic products have been developed to be lighter and thinner. However, the space available for the arrangement of input/output connection ports has thus been reduced, thereby hindering further functional expansion of the portable electronic products. For example, a conventional portable computer requires at least two connection ports: one is a DC jack which is used to receive a supply voltage to power the portable computer, and the other one is a universal serial bus (USB) through which the portable computer transmits and receives data. In other words, the supply-voltage receiving operation and the data-communication operation for the portable computer are performed through two different connection ports.

According to the above description, it is desired to provide an electronic device which comprises one connection port capable of receiving a supply voltage and further transmitting and receiving signals, thereby increasing the space available for the arrangement of input/output connection ports.

BRIEF SUMMARY OF THE INVENTION

An exemplary embodiment of an electronic device is provided. The electronic device is capable of being coupled to a first external device with a charging function. The electronic device comprises a connection interface, a voltage regulation unit, a storage unit, a charging unit, a battery unit, and a processing unit. The connection interface comprises a power pin and a first signal transmitting/receiving (T/R) pin set. The voltage regulation unit is coupled to the power pin. The storage unit is coupled to the first T/R pin set and powered by a first operation voltage. The storage unit stores device information of the electronic device. The charging unit is coupled to the power pin. The battery unit is coupled to the charging unit and charged by a charging voltage. The processing unit is coupled to the charging unit and powered by a second operation voltage. The processing unit performs a system operation of the electronic device. When the electronic device is in a power-exhaustion state and the first external device is coupled to the connection interface to provide a first supply voltage to the power pin, the voltage regulation unit transforms the first supply voltage to the first operation voltage, and the storage unit powered by the first operation voltage outputs the device information to the first external device via the first signal T/R pin set. When the first external device provides a second supply voltage to the power pin in response to the device information, the electronic device enters a charging state. In the charging state, the charging unit provides the charging voltage according to the second supply voltage, and the charging unit provides the second operation voltage to the processing unit according to the second supply voltage.

An exemplary embodiment of an electronic system is provided. The electronic system comprises a power supply device and an electronic device. The power supply device comprises a first connection interface, a control unit, and a power switching unit. The control unit is coupled to the first connection interface. The power switching unit is coupled to the first connection interface and controlled by the control unit. The power switching unit selectively provides a first supply voltage or a second supply voltage. The electronic device is capable of being powered by the power supply device. The electronic device comprises a second connection interface, a voltage regulation unit, a storage unit, a charging unit, and a battery unit. The second connection interface comprises a power pin and a signal transmitting/receiving (T/R) pin set. The voltage regulation unit is coupled to the power pin. The storage unit is coupled to the T/R pin set and powered by a first operation voltage. The storage unit stores device information of the electronic device. The charging unit is coupled to the power pin. The battery unit is coupled to the charging unit and charged by a charging voltage. When the electronic device is in a power-exhaustion state and the power supply device is coupled to the second connection interface via the first connection interface to provide the first supply voltage to the power pin by the power switching unit, the voltage regulation unit transforms the first supply voltage to the first operation voltage, and the storage unit powered by the first operation voltage outputs the device information to the control unit via the signal T/R pin set. When the control unit determines that the device information conforms to preset information, the control unit controls the power switching unit to provide the second supply voltage to the power pin, and the electronic device enters a charging state. In the charging state, the charging unit provides the charging voltage according to the second supply voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Electronic devices are provided. In an exemplary embodiment of an electronic device in FIG. 1, an electronic device 1 comprises a connection interface 10, a voltage regulation unit 11, a storage unit 12, a power switching unit 13, a charging unit 14, a processing unit 15, and a battery unit 16. In the embodiment, the connection interface 10 is a connection port supporting the Universal Serial Bus 3.0 (USB 3.0) transfer protocol. Thus, the connection interface 10 (USB 3.0) at least comprises two signal transmitting/receiving (T/R) pin sets and a power pin set. One signal T/R pin set comprises a positive voltage signal transmitting pin TX+, a negative voltage signal transmitting pin TX−, a positive voltage signal receiving pin RX+, and a negative voltage signal receiving pin RX−, and the other signal T/R pin set comprises a positive voltage signal T/R pin D+ and a negative voltage signal T/R pin D−. The power pin set comprises power pins VBUS and GND. The signal transmitting pins TX+ and TX− and the signal receiving pins RX+ and RX− are coupled to the processing unit 15, and the signal transmitting pins TX+ and TX− are also coupled to the storage unit 12. The signal T/R pins D+ and D− are coupled to the processing unit 15. The voltage regulation unit 11 and the charging unit 14 are coupled to the power pin VBUS. The power switching unit 13 is coupled to the power pin VBUS through a diode D10 and capable of providing a supply voltage to the power pin VBUS. The charging unit 14 is capable of providing an operation voltage to the processing unit 15, such that the processing unit 15 can operate according to the operation voltage to perform a system operation of the electronic device 1. The charging unit 14 is also capable of charging the battery unit 16. When the charging unit 14 is disabled, the battery unit 16 with remaining power can provide an operation voltage to the processing unit 15 for operation. The voltage regulation unit 11 can transform a voltage on the power pin VBUS to an operation voltage (such a voltage with 5V), and the operation voltage is provided to the storage unit 12 for operation. The storage unit 12 stores device information IFO12 (shown in FIG. 2A) of the electronic device 1, such as a product identification code (PID), a vendor identification code (VID), and/or device description. In the embodiment, the storage unit 12 is implemented by an electrically-erasable programmable read-only memory (EEPROM). Generally, the operation voltage for the operation of the processing unit 15 is higher than the operation voltage for the operations of the storage unit 12 and the switching unit 15.

Figure 1:
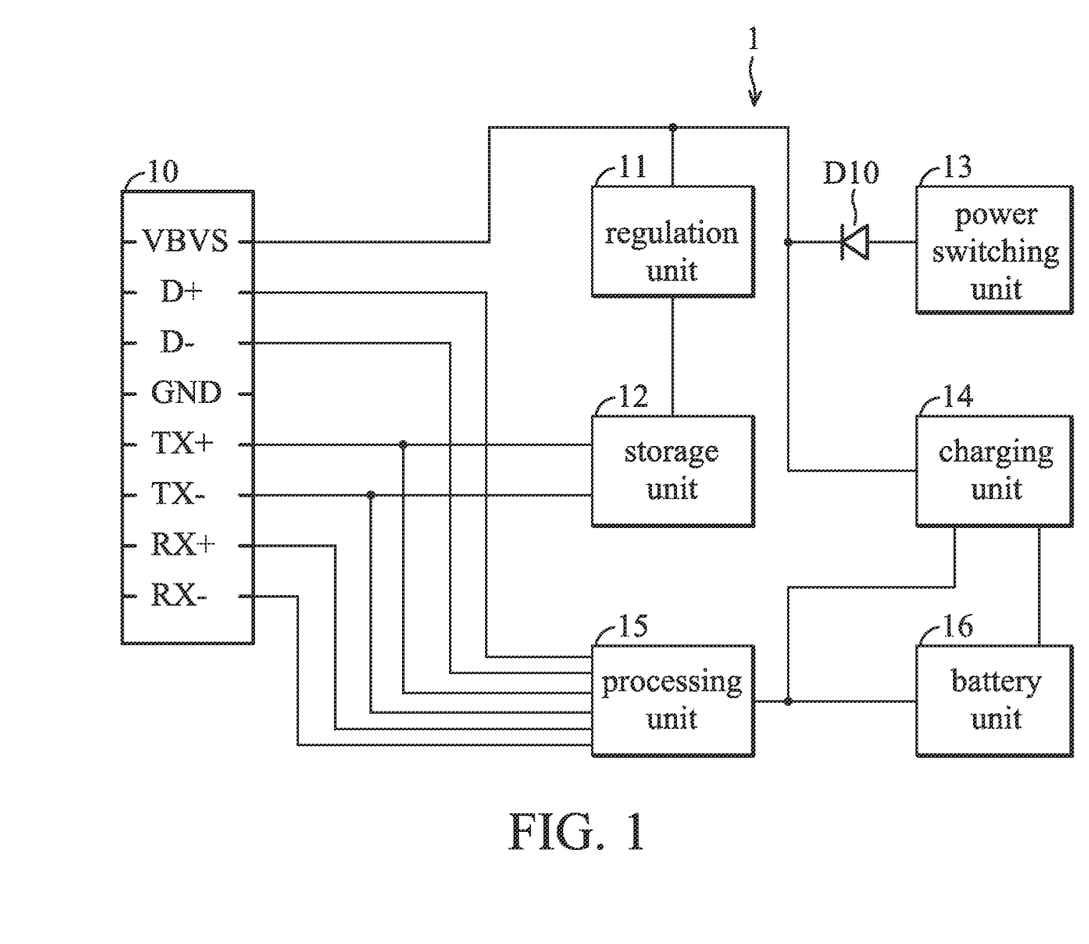
FIG. 1 shows an exemplary embodiment of an electronic system.

The electronic device 1 has two states according to whether the power of the electronic device 1 is exhausted or not: a non-power-exhaustion state and a power-exhaustion state. When the battery unit 16 has power remaining, the electronic device 1 is in the non-power-exhaustion state. In the non-power-exhaustion state, the battery unit 16 is capable of providing an operation voltage to the processing unit 15, such that the processing unit 15 can perform the system operation of the electronic device. Moreover, the power switching unit 13 is capable of providing a supply voltage to the power pin VBUS, and the voltage regulation unit 11 is capable of transforming the supply voltage to an operation voltage (such as a voltage of 3.3V or 5V) to the storage unit 12 for operation. When the battery unit 16 does not have any power, the electronic device 1 is in the power-exhaustion state. In the power-exhaustion state, the battery unit 16 is unable to provide an operation voltage to the processing unit 15, such that the electronic device 1 cannot be booted up (that is being shut down). Moreover, the power switching unit 13 is unable to provide a supply voltage to the power pin VBUS. Thus, when the electronic device 1 is in the power-exhaustion state, the electronic device 1 requires a charging process to be performed, such that the power switching unit 13 can once again provide a supply voltage to the power pin VBUS, and the battery unit 16 can once again provide an operation voltage to the processing unit 15.

Note that, when the electronic device 1 is in the power-exhaustion state and the charging process is required to be performed, a voltage provided by an external power supply apparatus coupled to the electronic device 1 may not be appropriate for the electronic device 1. In order to prevent the electronic device 1 from being damaged by a high voltage provided from the external power supply apparatus, the charging process is divided into two stages. At the first stage (FIG. 2A), a relatively small voltage (such as 3.3V or 5V), which is enough for the voltage regulation unit 11 and the storage unit 12 to operate, is provided. At this time, the electronic device 1 is not yet in a charging state. Then, an identification process is performed to determine whether a voltage provided by an external power supply apparatus at the second stage is appropriate for the electronic device 1 or not. If it is determined that the provided voltage is appropriate for the electronic device 1, then a relatively high voltage (such as 19V) is provided during the second stage (FIG. 2B) for charging. At this time, the electronic device 1 is in the charging state.

Figure 2A:
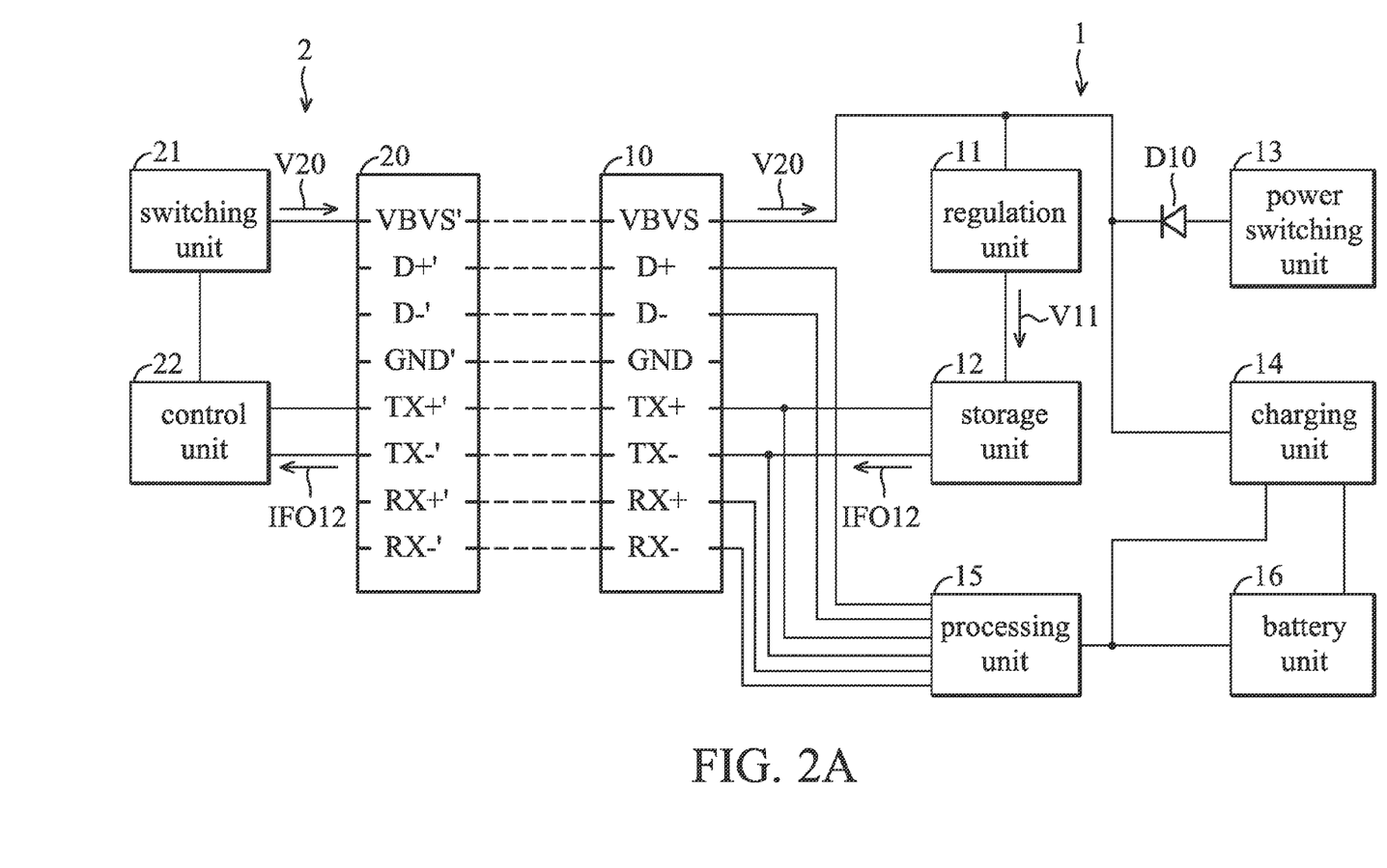
FIGS. 2A and 2B are schematic views showing a power supply device charging an electronic device of FIG. 1 in a power-exhaustion state according to an exemplary embodiment.

Referring to FIG. 2A, when the electronic device 1 is in the power-exhaustion state, an external power supply device 2, which is disposed outside of the electronic device 1 and has a charging function, can be coupled to the connection interface 10 to charge the electronic device 1. When the power supply device 2 is coupled to the electronic device 1, the electronic device 1 and the power supply device 2 form an electronic system. As shown in FIG. 2A, the power supply device 2 comprises a connection interface 20, a power switching unit 21, and control unit 22. The connection interface 20 corresponds to the connection interface 10 of the electronic device 1. Thus, the number of pins of the connection interface 20 is equal to the number of pins of the connection interface 10. According to the embodiment in FIG. 1, the connection interface 20 at least comprises signal transmitting pins TX+' and TX−', signal receiving pins RX+' and RX−', signal T/R pins D+' and D−', and power pins VBUS' and GND' which correspond to the signal transmitting pins TX+ and TX−, the signal receiving pins RX+ and RX−, the signal T/R pins D+ and D−, and the power pins VBUS and GND of the connection interface 10, respectively.

The signal transmitting pins TX+' and TX−' of the connection interface 20 are coupled to the control unit 22. The power pin VBUS' is coupled to the power switching unit 21. The power switching unit 21 initially provides a supply voltage V20 (such as a voltage of 5V). The control unit 22 is capable of controlling the power switching unit 21 to selectively switch, from providing the supply voltage V20, to providing a supply voltage V21 (such as a voltage of 19V, shown in FIG. 2B) to the power pin VBUS'.

Referring to FIG. 2A again, when the power supply device 2 is coupled to the connection interface 10, the supply voltage V20 is provided to the charging unit 14 via the power pins VBUS and VBUS'. However, the supply voltage V20 is not enough for the charging unit 14 to operate and provide an operation voltage to the processing unit 15 and to charge the battery unit 16 (this is because the voltage of 5V is too small for the charging unit 14). The voltage regulation unit 11 coupled to the power pin VBUS transforms the supply voltage V20 to an operation voltage V11 and provides the operation voltage V11 to the storage unit 12 for operation (this is because the storage unit 12 can operate by being powered by 5V or even 3.3V). At this time, the device information IFO12 stored in the storage unit 12 is read to the control unit 22 via the signal transmitting pins TX+ and TX− and the signal transmitting pins TX+' and TX−'. In the embodiment, the device information IFO12 stored in the storage unit 12 is read to the control unit 22 according to the I2C transfer protocol.

After the control unit 22 receives the device information IFO12 of the electronic device 1, the control unit 22 determines whether or not the device information IFO12 of the electronic device 1 conforms to preset information stored in the control unit 22 (the identification process). A determination result in which the device information IFO12 of the electronic device 1 conforms to the preset information stored in the control unit 22, such as the device information IFO12 comprising the supply voltage which can be received by the electronic device 1 being 19V and the preset information comprising the supply voltage which can be provided by the power supply device 2 being 19V, means that the electronic device 1 can be charged by the power supply device 2. A determination result in which the device information IFO12 of the electronic device 1 does not conform to the preset information stored in the control unit 22, such as the device information IFO12 comprising the supply voltage which can be received by the electronic device 1 being 12V and the preset information comprising the supply voltage which can be provided by the power supply device 2 being 19V, means that the electronic device 1 cannot be charged by the power supply device 2. In this situation, the power supply device 2 stops operating or performing other operations, preventing the electronic device 1 from being damaged by an extremely high supply voltage provided by the power supply device 2.

Figure 2B:
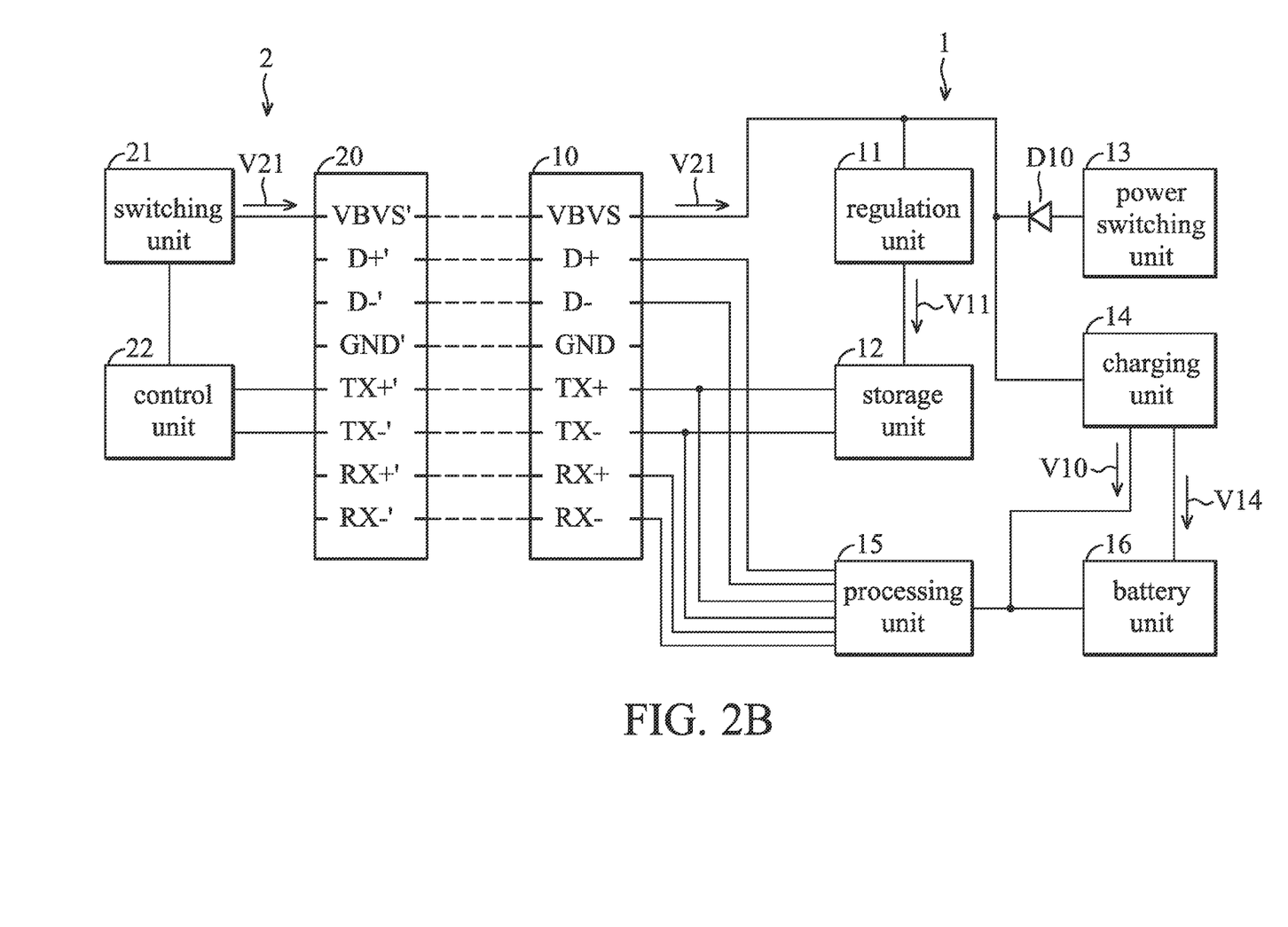

Referring to FIG. 2B, when the control unit 22 determines that the device information IFO12 of the electronic device 1 conforms to the preset information stored in the control unit 22, the control unit 22 controls the power switching unit 21 to switch to provide the supply voltage V21. The supply voltage V21 is provided to the power pin VBUS via the power pin VBUS'. Since the diode D21 provides isolation between the power pin VBUS and the power switching unit 13, the supply voltage V21 with a higher voltage level cannot be provided to the power switching unit 13 to damage the power switching unit 13. At this time, the electronic device 1 enters the charging state. In the charging state, the charging unit 14 operates to provide the operation voltage V10 to the processing unit 15 and a charging voltage V14 to charge the battery unit 16. Simultaneously, the voltage regulation unit 11 can transform the supply voltage V21 to the operation voltage V11 for the storage unit 12. Accordingly, the electronic device 1 is in the charging state and charged by the power supply device 2. After, the electronic device 1 is switched to the non-power-exhaustion state. The electronic device 1 can operate normally when it is booted up.

When the electronic device 1 is in the non-power-exhaustion state, the power supply device 2 may be coupled to the connection interface 10 via the connection interface 20. In one embodiment, when the electronic device 1 is in the non-power-exhaustion state, the electronic device 1 is shut down. In this situation, the battery unit 16 still has remaining power, and, because the electronic device 1 is not booted up, the power switching unit 13 is disabled and not providing a supply voltage to the power VBUS, and the processing unit 15 is also disabled and not performing the system operations of the electronic device 1. In the non-power-exhaustion state, when the power supply device 2 is coupled to the shut-down electronic device 1 via the connection interfaces 10 and 20, the operations of the electronic device 1 and the power supply device 2 are the same as the operations in the power-exhaustion state shown in FIGS. 2A and 2B, thus the related description is omitted. In other words, the electronic device 1 can perform the charging process when the electronic device 1 is shut down and in the non-power-exhaustion state.

Figure 3A:
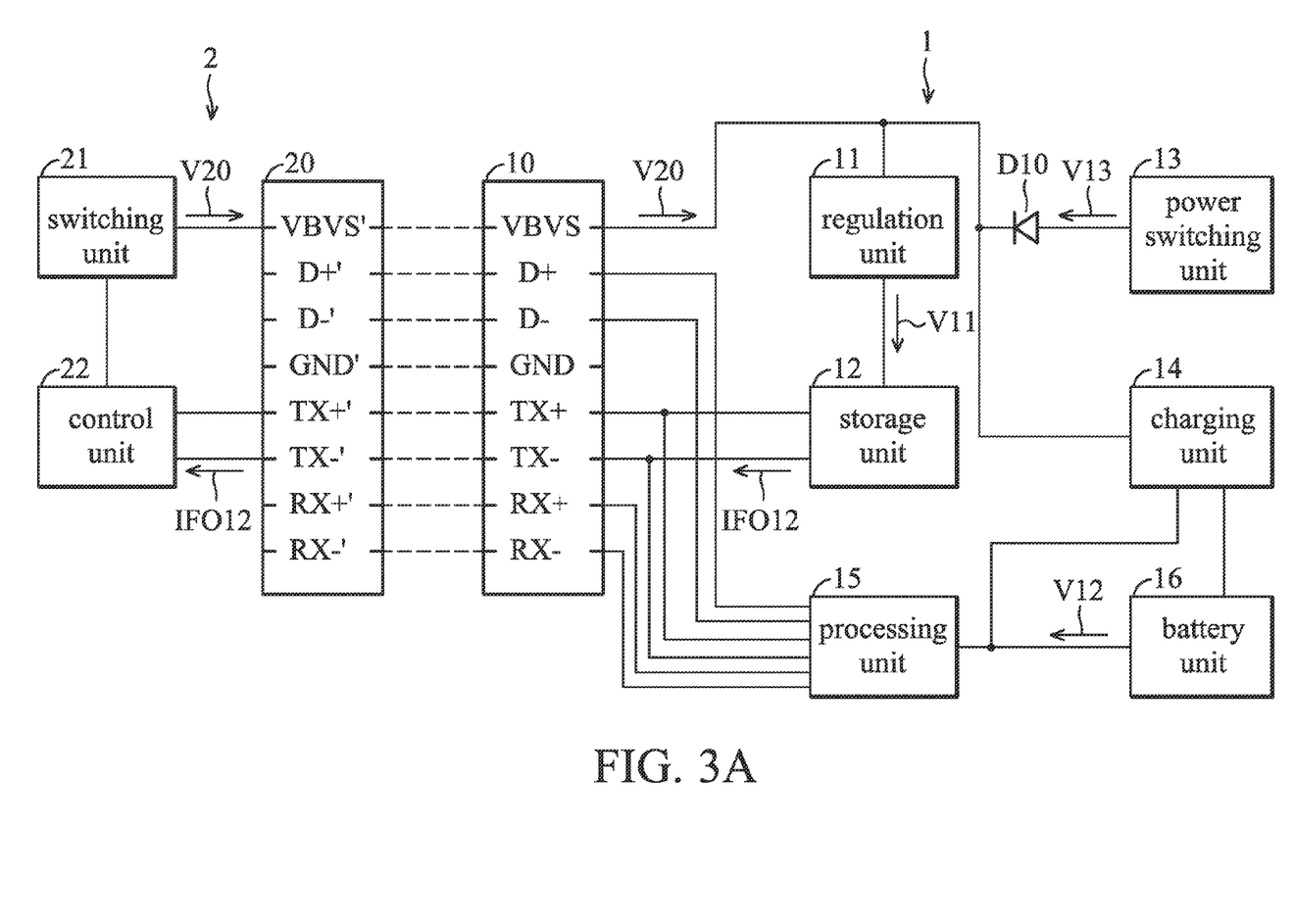
FIGS. 3A and 3B are schematic views showing a power supply device charging an electronic device of FIG. 1 in a non-power-exhaustion state according to an exemplary embodiment.

Referring to FIG. 3, when the electronic device 1 is in the non-power-exhaustion state, the electronic device 1 can be booted up since the battery unit 16 has remaining power. Referring to FIG. 3A, when the electronic device 1 is booted up, the power switching unit 13 is enabled to provide a supply voltage V13 to the power pin VBUS via the diode D10, and the battery unit 16 provides an operation voltage V12 to power the processing unit 15 to perform the system operation of the electronic device 1. When the power supply device 2 is coupled to the booted-up electronic device 2 via the connection interfaces 10 and 20, the supplying operation V20 is provided to the charging unit 14 via the power pins VBUS and VBUS'. In the embodiment, the supply voltage V13 provided by the enabled power switching unit 13 and the supply voltage V20 provided by the power switching unit 21 have the same voltage level, such a voltage level of 3.3V or 5V. At this time, the voltage at the power VBUS (V13/V20) is not enough to drive the charging unit 14 to provide the operation voltage V10 to the processing unit 15 and charge the battery unit 16 (this is because the voltage of 5V is too low for the charging unit 14). The voltage regulation unit 11 coupled to the power pin VBUS transforms the voltage (V13/V20) at the power pin VBUS to the operation voltage V11, and the operation voltage V11 is provided to the storage unit 12 for operation. The device information IFO12 stored in the storage unit 12 is read to the control unit 22 via the signal transmitting pins TX+ and TX− and the signal transmitting pins TX+' and TX−'. In the embodiment, the device information IFO12 stored in the storage unit 12 is read to the control unit 22 according to the I2C transfer protocol.

After the control unit 22 receives the device information IFO12 of the electronic device 1, the control unit 22 determines whether or not the device information IFO12 of the electronic device 1 conforms to preset information stored in the control unit 22 (the identification process). A determination result in which the device information IFO12 of the electronic device 1 conforms to the preset information stored in the control unit 22 means that the electronic device 1 can be charged by the power supply device 2. A determination result in which the device information IFO12 of the electronic device 1 does not conform to the preset information stored in the control unit 22 means that the electronic device 1 cannot be charged by the power supply device 2. In this situation, the power supply device 2 stops operating or performing other operations, preventing the electronic device 1 from being damaged by an extremely high supply voltage provided by the power supply device 2.

Figure 3B:
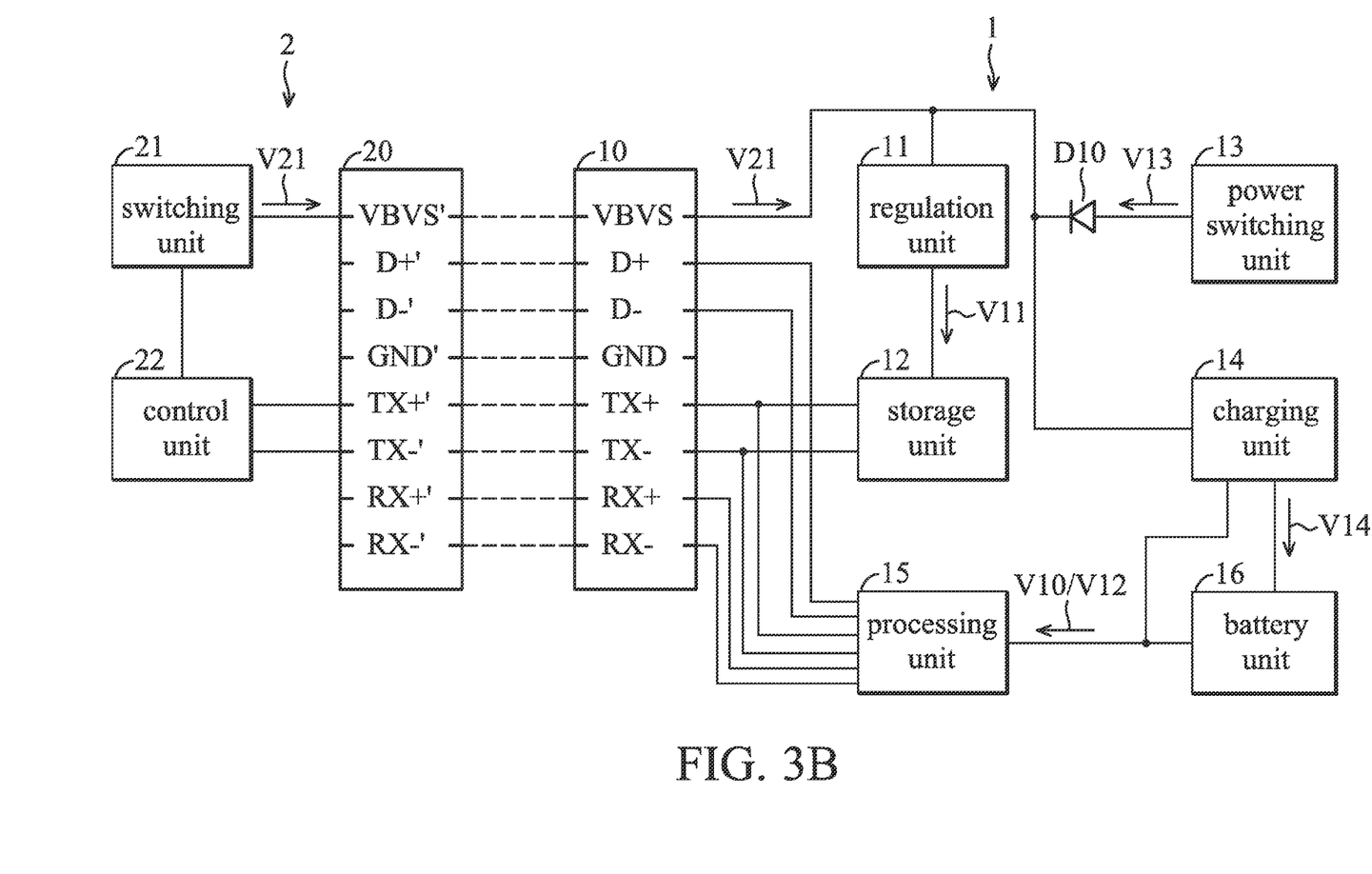

Referring to FIG. 3B, when the control unit 22 determines that the device information IFO12 of the electronic device 1 conforms to the preset information stored in the control unit 22, the control unit 22 controls the power switching unit 21 to switch to provide the supply voltage V21. The supply voltage V21 is provided to the power pin VBUS via the power pin VBUS'. Since the diode D21 provides isolation between the power pin VBUS and the power switching unit 13, the supply voltage V21 with a higher voltage level cannot be provided to the power switching unit 13 to damage the power switching unit 13. At this time, the electronic device 1 enters the charging state. In the charging state, the charging unit 14 operates to provide the operation voltage V10 to the processing unit 15 and the charging voltage V14 to charge the battery unit 16.

Simultaneously, the voltage regulation unit 11 can transform the supply voltage V21 to the operation voltage V11 for the storage unit 12. Accordingly, the electronic device 1 is in the charging state and being charged by the power supply device 2. In the embodiment, after the electronic device 1 enters the charging state, the battery unit 16 can stop providing the operation voltage V12 to the processing unit 15, and the processing unit 15 is switched to being powered by the operation voltage V10 provided by the charging unit 14. Alternatively, after the electronic device 1 enters the charging state, the processing unit 15 can be powered by the operation voltage V12 provided continuously by the battery unit 16. In the embodiment, the operation voltages V12 and V10 have the same voltage level.

Figure 4:
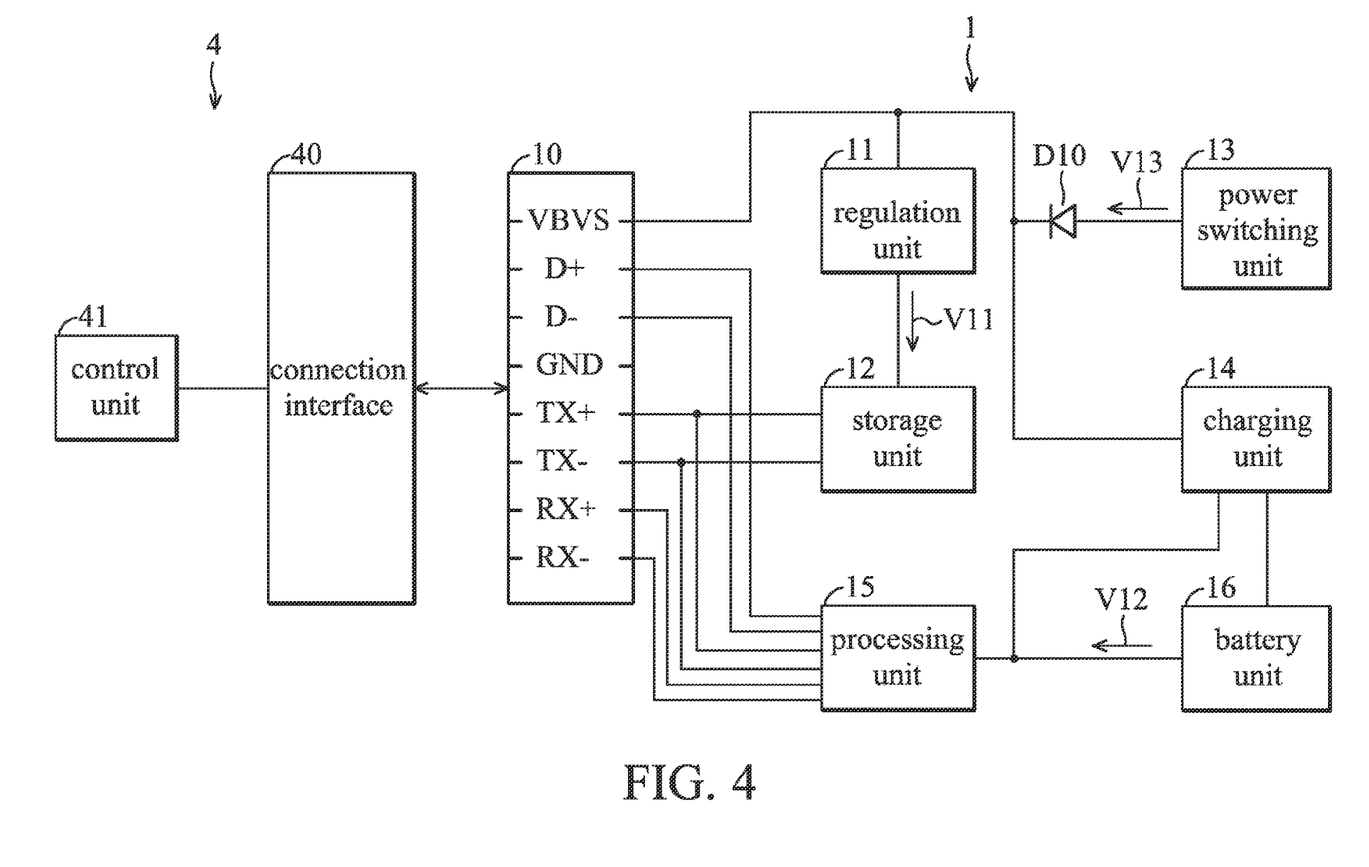
FIG. 4 is a schematic view showing signal communication between an external device without a charging function and an electronic device of FIG. 1 when the electronic device in a non-power-exhaustion state is booted up according to an exemplary embodiment.

In other embodiments, when the electronic device 1 is in the non-power-exhaustion state and booted up, an external device which does not have a charging function may be coupled to the electronic device 1 via the connection interface 10. Referring to FIG. 4, an external device 4 comprises a connection interface 40 and a control unit 41. The connection interface 40 corresponds to the connection interface 10 of the electronic device 1. Thus, the connection interface 40 is a connection port conforming to the USB 3.0 transfer protocol.

When the electronic device 1 is booted up, the power switching unit 13 is enabled to provide a supply voltage V13 to the power pin VBUS, and the battery unit 16 provides an operation voltage V12 to power the processing unit 15 to perform the system operation of the electronic device 1. In other words, the electronic device 1 normally operates in this situation. When the external device 4 is coupled to the electronic device 1 via the connection interfaces 10 and 40, the processing unit 15 and the control unit 41 can perform signal communication therebetween by the USB 3.0 transfer protocol via the signal transmitting pins TX+ and TX– and the signal receiving pins RX+ and RX–. Alternatively, the processing unit 15 and the control unit 41 can perform signal communication therebetween by the USB 2.0 transfer protocol via the signal T/R pins D+ and D–.

According to the above description, the electronic device 1 of the proposed embodiments comprises a connection interface 10 capable of receiving a supply voltage and further transmitting and receiving signals. Particularly, when the connection interface 10 supports the USB 3.0 transfer protocol and the power supply device 2 with the device information conforming to the preset information is coupled to the electronic device 1, the power supply device 2 can charge the electronic device 1 via the connection interface 10. Moreover, the electronic device 1 may perform signal communication of the USB 3.0 transfer protocol and USB 2.0 transfer protocol with an external device. Thus, the connection interface 10 supports signal communications and the charging operation, thereby increasing the space available for the arrangement input/output connection ports in the electronic device 1.

As described above, both the storage unit 12 and the processing unit 15 are coupled to the signal transmitting pins TX+ and TX–. However, the signal communication between the storage unit 12 and the signal transmitting pins TX+ and TX– and the signal communication between the processing unit 15 and the signal transmitting pins TX+ and TX– do not interfere with each other. One skilled in the art has known that a main processing unit supporting the USB 3.0 transfer protocol performs signal communication with external devices in a current transmission form, while an EEPROM performs signal communication with external devices in a voltage transmission form. Thus, in the embodiments of the present invention, when the processing unit 15 performs signal communication of the USB 3.0 via the signal transmitting pins TX+ and TX–, the current between the processing unit 15 and the signal transmitting pins TX+ and TX– does not drive the storage unit 12 to perform reading/writing operations. Moreover, the input impedance of the storage unit 12 is infinitesimal and thus acts as an open circuit. Thus, the current between the processing unit 15 and the signal transmitting pins TX+ and TX– does not affect the storage unit 12. Further, the operation frequency of the processing unit 15 is generally equal to 5 GHz, while the operation frequency of the storage unit 12 is generally equal to 500 KHz. The difference between the operation frequencies of the processing unit 15 and the storage unit 12 is much too high. Therefore, signal communication between the processing unit 15 and the signal transmitting pins TX+ and TX– does not induce the storage unit 12 to perform undesired operations.

In order to achieve signal communication between a main processing unit and external devices in a current transmission form, there is one set of current source and capacitor (the capacitance value is generally equal to 0.1μ) coupled between the main processing unit and each of the signal transmitting pins TX+ and TX–. In the embodiment, compared with the capacitance values of the capacitors between the main processing unit and the signal transmitting pins TX+ and TX–, capacitance values of capacitors in the storage unit 12 are relatively much small (generally being less than 10 p). Thus, the capacitance effect induced by the storage unit 15 coupled to the signal transmitting pins TX+ and TX– does not crucially affect the processing unit 15.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device capable of being coupled to a first external device with a charging function, comprising
    a connection interface comprising a power pin and a first signal transmitting/receiving (T/R) pin set;
    a voltage regulation unit coupled to the power pin;
    a storage unit, coupled to the first T/R pin set and powered by a first operation voltage, for storing device information of the electronic device;
    a charging unit coupled to the power pin;
    a battery unit, coupled to the charging unit and charged by a charging voltage; and
    a processing unit, coupled to the charging unit and powered by a second operation voltage, for performing a system operation of the electronic device;
    wherein when the electronic device is in a power-exhaustion state and the first external device is coupled to the connection interface to provide a first supply voltage to the power pin, the voltage regulation unit transforms the first supply voltage to the first operation voltage, and the storage unit powered by the first operation voltage outputs the device information to the first external device via the first signal T/R pin set,
    wherein when the first external device provides a second supply voltage to the power pin in response to the device information, the electronic device enters a charging state, and
    wherein in the charging state, the charging unit provides the charging voltage according to the second supply voltage, and the charging unit provides the second operation voltage to the processing unit according to the second supply voltage, wherein the first signal T/R pin set of the connection interface comprises:
a first positive voltage signal T/R pin coupled to the storage unit and the processing unit;
a first negative voltage signal T/R pin coupled to the storage unit and the processing unit;
a second positive voltage signal T/R in coupled to the processing unit; and
a second negative voltage signal T/R pin coupled to the processing unit,
wherein the electronic device is capable of being coupled to a second external device without the charging function,
wherein when the electronic device is in a non-power-exhaustion state and booted up and the second external device is coupled to the connection interface, the electronic device performs signal communication between the processing unit and the second external device by a first transfer protocol via the first signal T/R pin set.

2. The electronic device as claimed in claim 1, wherein the first transfer protocol is a Universal Serial Bus 3.0 (USB 3.0) transfer protocol.

3. The electronic device as claimed in claim 1,
wherein the connection interface further comprises a second signal T/R pin set, and the second signal T/R pin set is coupled to the processing unit; and
wherein when the electronic device is in the non-power-exhaustion state and booted up and the second external device is coupled to the connection interface, the electronic device performs signal communication between the processing unit and the second external device by a second transfer protocol via the second signal T/R pin set.

4. The electronic device as claimed in claim 3, wherein the second transfer protocol is a Universal Serial Bus 2.0 (USB 2.0) transfer protocol.

5. An electronic device capable of being coupled to a first external device with a charging function, comprising
a connection interface comprising a power in and a first signal transmitting/receiving (T/R) pin set;
a voltage regulation unit coupled to the power pin;
a storage unit, coupled to the first T/R in set and powered by a first operation voltage, for storing device information of the electronic device;
a charging unit coupled to the power pin;
a battery unit, coupled to the charging unit and charged by a charging voltage; and
a processing unit, coupled to the charging unit and powered by a second operation voltage, for performing a system operation of the electronic device;
wherein when the electronic device is in a power-exhaustion state and the first external device is coupled to the connection interface to provide a first supply voltage to the power pin, the voltage regulation unit transforms the first supply voltage to the first operation voltage, and the storage unit powered by the first operation voltage outputs the device information to the first external device via the first signal T/R in set,
wherein when the first external device provides a second supply voltage to the power pin in response to the device information, the electronic device enters a charging state,
wherein in the charging state, the charging unit provides the charging voltage according to the second supply voltage, and the charging unit provides the second operation voltage to the processing unit according to the second supply voltage,
wherein when the electronic device is in a non-power-exhaustion state and shut down and the first external device is coupled to the connection interface to provide the first supply voltage to the power pin, the voltage regulation unit transforms the first supply voltage to the first operation voltage, and the storage unit powered by the first operation voltage outputs the device information to the first external device via the first signal T/R pin set, and
wherein when the first external device provides the second supply voltage to the power pin in response to the device information, the electronic device enters the charging state.

6. An electronic device capable of being coupled to a first external device with a charging function, comprising
a connection interface comprising a power pin and a first signal transmitting/receiving (T/R) in set;
a voltage regulation unit coupled to the power pin;
a storage unit, coupled to the first T/R pin set and powered by a first operation voltage, for storing device information of the electronic device;
a charging unit coupled to the power pin;
a battery unit, coupled to the charging unit and charged by a charging voltage; and
a processing unit, coupled to the charging unit and powered by a second operation voltage, for performing a system operation of the electronic device;
wherein when the electronic device is in a power-exhaustion state and the first external device is coupled to the connection interface to provide a first supply voltage to the power pin, the voltage regulation unit transforms the first supply voltage to the first operation voltage, and the storage unit powered by the first operation voltage outputs the device information to the first external device via the first signal T/R pin set,
wherein when the first external device provides a second supply voltage to the power pin in response to the device information, the electronic device enters a charging state,
wherein in the charging state, the charging unit provides the charging voltage according to the second supply voltage, and the charging unit provides the second operation voltage to the processing unit according to the second supply voltage,
wherein when the electronic device is in a non-power-exhaustion state and is booted up and the first external device is coupled to the connection interface to provide the first supply voltage to the power pin, the voltage regulation unit provides the first operation voltage to the storage unit, and the storage unit powered by the first operation voltage outputs the device information to the first external device via the first signal T/R pin set, and
wherein when the first external device provides the second supply voltage to the power pin in response to the device information, the electronic device enters the charging state.

7. The electronic device as claimed in claim 6 further comprising:
a power switching unit for providing a third supply voltage to the power pin when the electronic device is in the non-power-exhaustion state and is booted up,
wherein the third supply voltage and the first supply voltage have the same voltage level, and wherein when the electronic device is in the non-power-exhaustion state and is booted up and the first external device is coupled to the connection interface, the voltage regulation unit transforms a voltage at the power pin to the first operation voltage.

* * * * *